UNITED STATES PATENT OFFICE.

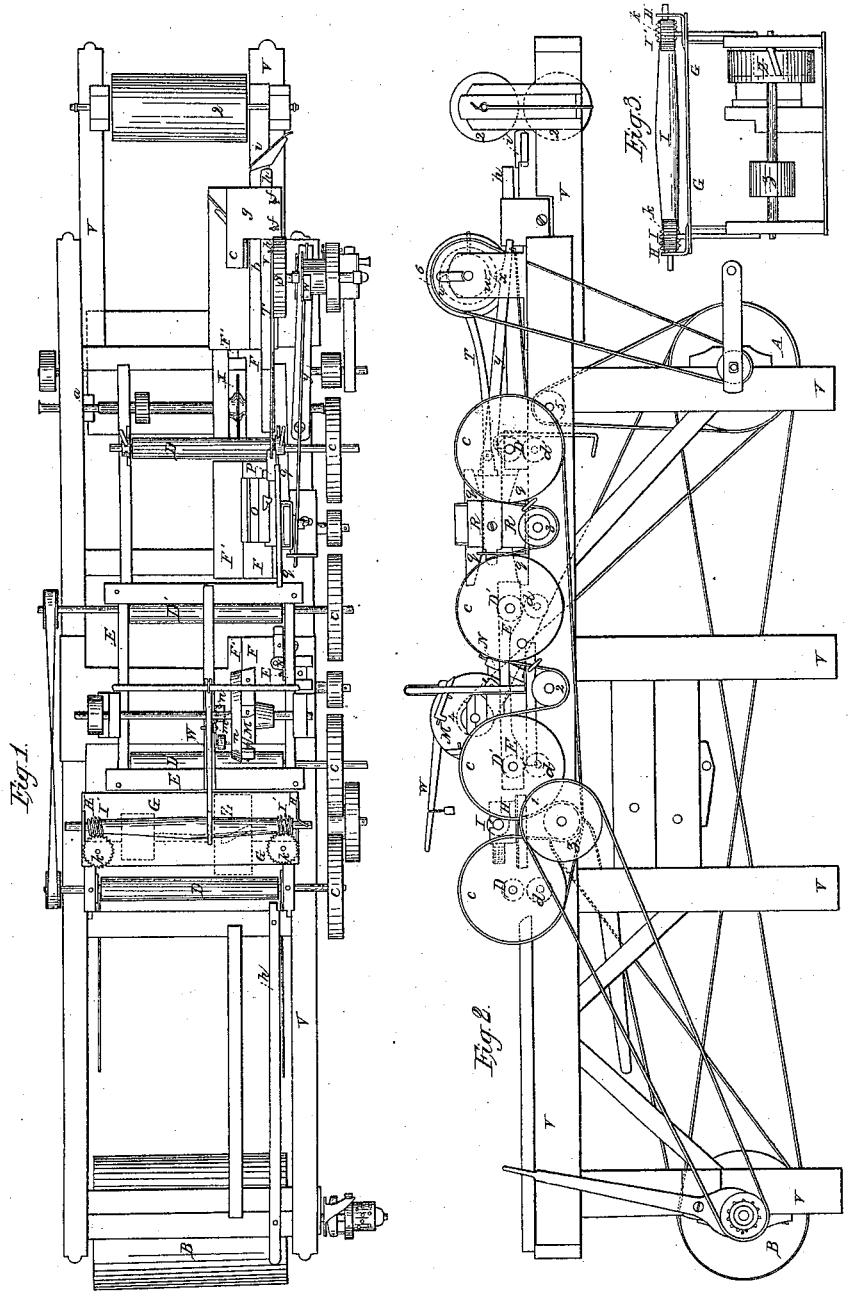

AMBROSE CHURCH, JR., OF CANANDAIGUA, NEW YORK.

MACHINE FOR PLANING MOLDINGS ON WOOD.

Specification of Letters Patent No. 296, dated July 29, 1837.

*To all whom it may concern:*

Be it known that I, AMBROSE CHURCH, Jr., of Canandaigua, in the county of Ontario and State of New York, have invented a new and useful machine to make moldings in the art or business of house-carpentering and joinery and to shape the stuff for window-sashes as well as other purposes in carpentry and joinery.

The nature and object of my machine are to save manual labor and to give more accuracy and uniformity as well as more expedition and economy to the work of the house-carpenter and joiner.

To anable others skilled in the art or trade of the carpenter and joiner to make and use my said invention or machine, I will proceed to describe its construction and operation, by means of description words and drawings, with letters and figures indicating references, and the connection between said words and drawings, as follows, to wit:

The letters V, V, V, V, V, V, denote the general frame work of the machine, which sustains the other movable and fixed parts of the machinery.

A, and B, are drums coupled by belts with other parts of the gearing and driving the machine.

C C C C are pulleys or wheels fixed firmly on the ends of the axes of the solid fluted rollers, which carry the board, plank, or other stuff through the machine, to be worked.

D $d$, D $d$, D $d$, D $d$, are sets of solid fluted rollers, two in a set, one right over the other, the upper one D; and the under one $d$. These rollers, which may be termed speed-rollers, hold the board, or other piece of wood to be worked, firmly between them, and as they turn on their axes in contrary directions, that is, toward each other, they carry the said board, or other wood, from which the molding, or sash, or other thing, is to be made, through the machine. The upper roller D, in eash set, is movable up and down, to accommodate the thickness of the board &c. from which the molding &c. is to be cut, except the first set, of which the upper one D, is fixed, and the lower one, $d$, is movable. E, E, E, E, mark a frame in which two of the upper speed rollers D′, D′, are fixed, and which frame may be moved up and down, and gaged to suit the thickness of the molding required. F, F, F, denote the bed on and along which the board, or other piece of wood to be worked upon, passes; the outer or left hand portion F′, F′, F′, of said bed, through its whole length, being rabbeted down to accommodate that part of the board &c. which is not included in the width of the molding, sash, or other thing to be made. G, G, denote an iron plate under which the board &c. passes. This plate can be raised, or lowered, to accommodate the thickness of the board &c. from which the molding &c. is to be cut. The raising and lowering of this plate are effected by endless screws I′ I′ cut on the ends of the shaft I, which revolves on its own axis, in the upright metal plates H, H, and which screws mesh with the pinions $k$, $k$, which are cut, or fluted, or grooved, to correspond with said screws; these pinions are fixed to the heads of screws passing through the plate G, G, and resting on an immovable base.

Under the plate G, G, is a hollow cylinder of iron Z, Fig. 3, about 12 inches in diameter, turning by means of a pulley $z$ on its axis, and to which are fixed knives from 2 to 6 in number, having an oblique edge like a rabbet-plane, for dressing off the under face, or side, of that part of the board on the upper side of which the molding &c. is to be cut. The letter $m$, denotes an iron standard with two small pulleys, or wheels, marked $n$, $n$, which turn on their own axes, are fixed to the lower end of the standard and assist to hold down the board &c. closely upon the bed. M is a wheel with cutters, or knives, from 2 to 6 in number, having their edges of the shape of the required molding &c. They are attached to the side of the wheel by means of screws and nuts, and, presenting their edges to the board as it is driven along the bed under them, they cut the molding &c. N is a slide furnished with an immovable pin at the lower end, on which pin is put a metal roller of the shape of the required molding &c. The slide itself is raised or lowered to suit the thickness of the molding and secured to its gage by screws. O is a plane stock with a planing-iron having its edge of the form of the molding &c. P is a slide to which the plane-stock O is fastened. $q$, $q$, $q$, $q$, denote ways in which the slide P moves horizontally. R is a frame having ways for the other ways $q$, $q$, $q$, $q$, with the slide P, to move up and down in. S denotes a crank-pulley having attached to it a sweep T, which moves the slide P, and which sweep is secured to the crank-pulley by the pin and slide v. This part of the apparatus regulates the action of the plane O as the latter descends upon the molding and rises from it, and gives to said plane its length of stroke. The dotted irregular curve line marked w, w, w, indicates a projection, on the back side of the crank pulley, which projection operates as a cam and acts upon x, a projection from the lever y, the use of which lever is to press down the plane O for the purpose of dressing off the molding.

The letter X denotes a circular, or buzz saw, which is movable laterally on its journal a, and may be there gaged to the width of the molding, &c. which it cuts from the board as it is driven along the bed.

The letter b, denotes a short and gentle elevation, or inclined plane, rising from the inner part of the bed along which the molding &c. runs, and raising the molding &c. (now that it has been cut by the saw X from the rest of the board,) so as to present the back edge of the molding to the plane c, to be dressed off. This plane c, is attached to an iron slide-plate g, which is secured to the fence h, h, by the bolts f, f, which pass through long holes in the plate g, and permit it to be moved laterally and set, or gaged, so as to accommodate the width of the molding &c. The letter i denotes another plane-stock with one or more irons to dress the edge of the remaining part of the board &c. from which the molding, or other thing, has just been cut, and thus prepare it to be reinserted into the machine and have another molding, or other stuff, cut from it. The letters Q, Q, denote rollers designed to keep the board well in its place on the bed so that the plane i, may trim the edge of the board.

The figures 1, 2, 3, 4, 5, 6, denote pulleys, or wheels, around which bands or belts pass to drive the different parts of the machine. The letters h, h, denote the fence against the side of which the edge of the board, or other piece of wood, (from which the molding, or sash, or other thing is to be cut,) is held or pressed as it passes along the bed. This fence consists of one or more pieces of scantling, or plank, firmly secured to the frame and at a right angle with the bed. The letter W denotes a lever fixed to the upper end of the standard m, and having on its long arm a weight to press down the rollers n, n, upon the board, as it passes under the knives attached to the wheel M, and to hold it snugly to the bed.

To use the machine herein described, stand at the end of it which is represented at the left hand of the drawing and present the board, plank, or other stuff, to be operated upon, with its right edge snug to that fence, and the end to the first pair of rollers D d, so that the said board, or other stuff, shall be taken between said rollers. As the machine moves, these rollers will force the board or other stuff, horizontally along under the plate G, G, and between that plate and the hollow iron cylinder armed with cutters, or knives, which dress, or plane, or trim, the under side of the board, said board being held down to the knives by the fixed upper roller D in the first set of rollers, and by the plate G, G. The end of the board, as soon as it passes the edge of the plate G, G, is received between the next pair of rollers D d, immediately in front of the wheel M, to which are fixed the knives which shape the molding or sash or other thing to be made. As soon as the end of the board passes this pair of rollers it is received upon the solid bed, by which as well as by the rollers d, it is held up to the action of the knives fixed upon the wheel M.

As the end of the board &c. moves on from under the knives, the portion of it on which the molding is now cut, passes along on the bed under the small metal roller, which turns on the pin attached to the slide N, which roller, being shaped to the molding, or other thing to be made, is enabled thereby to hold the board with its edge snug to the fence h, h, as well as to keep it close to the bed. Shortly after passing this roller, the end of the board is taken by the next set of rollers D d, and passed along on the bed so as to receive the action of the plane-iron in the stock O, which action is so regulated by the crank-pulley S, and the apparatus connected with it, as to give a neat and smooth finish to the face of the molding. The end of the board is then received between the next pair of rollers D d, and passing through them is presented to the circular saw X, which having been rightly set on its journal, cuts off the molding from the rest of the board. After passing the saw, the molding rises up the inclined plane b, and has its back edge dressed by the plane c. When the molding has passed this plane c, it is finished. At the time when the molding rises along the inclined plane b, the other part of the board continues moving along on the bed, and has its edge, from which the molding has just been separated, presented to the planing-iron i, to be dressed and made ready to be passed through the machine again.

What I claim in the arrangement of this apparatus herein described, as constituting a new application of old principles, to operation in joiner-work which have not been before performed by machinery, so combined, is—

1. The plan of rabbeting down part of the bed, in the manner and for the purpose described; the hollow iron cylinder armed with knives under the plate G, G, for dressing off the underside of the board, or other stuff; the using of the small metal roller on the pin of the slide N, shaped like the molding, or other thing to be made, and which, like the knives on the wheel M, and the plane iron in the plane-stock O, is to be changed according to the shape of the work to be done.

2. I claim also in combination the particular arrangement of the apparatus, for moving, or working, the plane O, and the plane-stocks c, and i, with their irons to dress the edges of the molding and the board, as my own invention.

This machine may be driven by horse-power, or steam, or water, and the various modes now in use of attaching the power to the machine, with the various kinds of gearing, may be employed.

AMBROSE CHURCH, Jr

Witnesses:
  O. S. HOLLEY,
  A. R. CHURCH.